(12) United States Patent
Herrmann et al.

(10) Patent No.: US 9,925,942 B2
(45) Date of Patent: Mar. 27, 2018

(54) ENERGY ABSORBING SYSTEM FOR ABSORBING ENERGY OF AN OBJECT IN A VEHICLE IN A CRASH SITUATION

(71) Applicant: AIRBUS HELICOPTERS DEUTSCHLAND GMBH, Donauworth (DE)

(72) Inventors: Marius Herrmann, Gersthofen (DE); Roberto Gusmini, Munich (DE); Frank Seidel, Augsburg (DE); Marius Klinkner, Augsburg (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 129 days.

(21) Appl. No.: 15/210,931

(22) Filed: Jul. 15, 2016

(65) Prior Publication Data

US 2017/0021791 A1 Jan. 26, 2017

(30) Foreign Application Priority Data

Jul. 22, 2015 (EP) .................................... 15400032

(51) Int. Cl.
*B60R 21/055* (2006.01)
*B60N 2/42* (2006.01)
(Continued)

(52) U.S. Cl.
CPC .............. *B60R 21/055* (2013.01); *B60N 2/42* (2013.01); *B60N 2/42709* (2013.01); *B64D 11/0619* (2014.12); *B64D 25/04* (2013.01); *B60R 2021/0032* (2013.01); *B60R 2021/0093* (2013.01); *B60R 2021/0293* (2013.01)

(58) Field of Classification Search
CPC ... B60R 21/055; B64D 11/0619; B64D 25/04; B60N 2/42; B60N 2/42709
See application file for complete search history.

(56) References Cited

U.S. PATENT DOCUMENTS 3,744,814 A * 7/1973 Sturman ................. B60R 22/28
180/270
5,273,240 A 12/1993 Sharon
(Continued)

OTHER PUBLICATIONS

Extended European Search Report for European Application No. EP 1540032.7, Completed by the European Patent office, Dated Mar. 4, 2016, 6 Pages.

*Primary Examiner* — Faye M Fleming
(74) *Attorney, Agent, or Firm* — Brooks Kushman P.C

(57) ABSTRACT

An energy absorbing system that is adapted for absorbing energy of an object in a vehicle in a crash situation by decreasing acceleration and force acting on the object in the crash situation, the energy absorbing system comprising at least one plastically deformable energy absorber that is plastically deformable in the crash situation. A mass-dependent self-adjusting mechanism is provided, the mass-dependent self-adjusting mechanism being adapted for adjusting, on the basis of an underlying mass of the object, a required compensation force that is to be provided by the energy absorbing system in the crash situation for plastically deforming the at least one plastically deformable energy absorber in order to decrease the acceleration and force acting on the object.

15 Claims, 6 Drawing Sheets

(51) Int. Cl.
*B64D 11/06* (2006.01)
*B60N 2/427* (2006.01)
*B64D 25/04* (2006.01)
*B60R 21/00* (2006.01)
*B60R 21/02* (2006.01)

(56) References Cited

U.S. PATENT DOCUMENTS

| | | | |
|---|---|---|---|
| 6,454,199 B1* | 9/2002 | Hori | B60R 22/4633 |
| | | | 242/374 |
| 2002/0079725 A1 | 6/2002 | George Ruff et al. | |
| 2009/0322066 A1 | 12/2009 | Dong | |
| 2009/0326765 A1* | 12/2009 | Dong | B60R 22/28 |
| | | | 701/45 |
| 2010/0066116 A1* | 3/2010 | Coenen | B60N 2/4214 |
| | | | 296/65.01 |

* cited by examiner

ENERGY ABSORBING SYSTEM FOR ABSORBING ENERGY OF AN OBJECT IN A VEHICLE IN A CRASH SITUATION

CROSS-REFERENCE TO RELATED APPLICATIONS

This application claims priority to European patent application No. EP 15400032.7 filed on Jul. 22, 2015, the disclosure of which is incorporated in its entirety by reference herein.

BACKGROUND OF THE INVENTION (1) Field of the Invention

The invention is related to an energy absorbing system that is adapted for absorbing energy of an object in a vehicle in a crash situation by decreasing acceleration and force acting on said object in said crash situation. The invention is further related to a vehicle seat and to a vehicle having a seat provided with such an energy absorbing system.

(2) Description of Related Art

An Energy Absorbing System (EAS), which may also be referred to as an Energy Absorption/Attenuation System, is usually provided in a crashworthy seat of a vehicle, such as an aircraft, for protecting an occupant of the crashworthy seat e.g. in a crash situation of the vehicle by reducing an occurring body load. Currently, complex EAS exist that are automatically electronically adjustable, for instance by using magneto-rheological fluids. Furthermore, fixed-force EAS with multiple different functioning principles exist, which are generally cheaper and easier to manufacture.

The document US2002/0079725 describes an exemplary fixed-force EAS for absorbing energy of a vehicle or component of a vehicle or occupant of the vehicle in a crash situation so as to allow relatively gradual deceleration of the vehicle, component or occupant. This fixed-force EAS includes a first part, a second part and an elongate deformable member secured to the first part and extending through a deforming arrangement carried by the second part. The elongate deformable member normally acts as a tie or strut between the first and second parts, but the arrangement is such that, when the force acting between these first and second parts exceeds a predetermined amount in a predetermined direction, the elongate deformable member is forced progressively through the deforming arrangement as the distance between the first and second parts changes and the deformable member is thereby forced to undergo plastic deformation, whereby energy is absorbed. The deforming arrangement is such as to effect such plastic deformation substantially without changing the material cross sectional area of the deformable member.

More specifically, the fixed-force EAS according to the document US2002/0079725 is implemented as a roller-tube assembly, wherein the deforming arrangement is provided by means of a roller arrangement having rollers with fixed, i.e. predefined, distances relative to each other, and the deformable member is provided by means of a plastically deformable attenuation tube. In other words, energy absorption/attenuation is performed by deformation of the attenuation tube by means of the rollers with the predefined distances relative to each other.

However, by fixing the distances between the rollers of the roller arrangement to such predefined distances, the rollers may only transmit a predetermined compression force to the plastically deformable attenuation tube for plastically deforming the latter. Consequently, this system can only be manually and stepwise adjusted by adding and connecting additional roller-tube assemblies.

The document US2002/0079725 further describes that manual or automatic adjustment of the energy absorbing characteristics of the described roller-tube assembly can be achieved in a number of ways, including:

(1) Adjustment of wall thickness by rotating, about its longitudinal axis, an attenuation tube having a circular cross-section exterior and a non-circular internal cross-section, to various positions within the roller arrangement, so as to vary the force required to flatten or deform the attenuation tube and hence to alter the attenuation characteristics.

(2) Partially pre-deforming, e. g. flattening, the attenuation tube varying amounts:

(2.1) Rotation of an attenuation tube having a noncircular form of constant or varying wall thickness such that different parts of the periphery of the attenuation tube are presented to the rollers of the roller arrangement so that different forces are needed to deform the attenuation tube, thus providing adjustment for different occupants.

(2.2) Varying a predefined gap between the rollers of the roller arrangement or equivalent parts of the respective deforming arrangement, thereby increasing or decreasing the force required to flatten/deform the attenuation tube.

(3) Varying the roller diameter via tapered cones. In a similar fashion to (2.2) above, the gap that the attenuation tube is required to pass through may be either increased or decreased by moving the rollers of the roller arrangement or other corresponding fixed members as appropriate to present the desired diameter to the attenuation tube, thus, changing the attenuation properties.

However, while the document US2002/0079725 describes that the energy absorbing characteristics of the described roller-tube assembly can be adjusted manually or automatically and further enumerates a number of ways how this can be achieved, it remains silent on concrete realizations. For instance, one described way consists in varying a predefined gap between the rollers of the roller arrangement for increasing or decreasing the force required to flatten/deform the attenuation tube. Nevertheless, it is not described how this variation is performed, whether it is performed manually or automatically, whether it is performed between different discrete predefined gap values and so on.

The document US2009/326765 describes load limiting on a seat belt buckle by providing an adjustable energy absorbing device mounting the seat belt buckle. Vehicle and occupant conditions are electronically sensed to determine the optimal adjustment of the adjustable energy absorbing device. The adjustable energy absorbing device is an extendable strut having an end connected to the buckle and an end connected to the vehicle. The strut has metal deforming elements to be deformed upon the load reaching a certain magnitude by ball shaped plow shoes.

The document US2009/322066 describes a load limiting device for mounting a seat belt buckle that also includes a plow shoe attached to one of the buckle and a pair of opposed plates attached to the other of the buckle and the vehicle. The plow shoe travels between the plates and absorbs energy by deforming at least one of the plates. An electronic adjuster mechanism adjusts the distance between the opposed plates to selectively increase or decrease the energy absorbing capacity of the load limiting device.

The document U.S. Pat. No. 5,273,240 describes an impact energy absorption system for aircraft seats. A seat is movable between a first unloaded position and a second crash induced position. A deforming die and an additional set of die jaws are connected to a seat mounting and defines an aperture of variable size. A deformable rod has a shoulder connecting the seat to the mounting the rod passing through the deforming die and the variable die jaws. During crash induced movement of the seat, the rod is pulled through the deforming die.

BRIEF SUMMARY OF THE INVENTION

It is, therefore, an object of the present invention to provide a new EAS that is adapted for absorbing energy of an object in a vehicle in a crash situation by decreasing acceleration and force acting on the object in the crash situation, wherein the EAS is automatically adjustable for use with arbitrary object masses.

This object is solved by an EAS that comprises the features of claim 1. More specifically, according to the present invention an EAS that is adapted for absorbing energy of an object in a vehicle in a crash situation by decreasing acceleration and force acting on the object in the crash situation, comprises at least one plastically deformable energy absorber that is plastically deformable in the crash situation. A mass-dependent self-adjusting mechanism is provided. The mass-dependent self-adjusting mechanism is adapted for adjusting, on the basis of an underlying mass of the object, a required compensation force that is to be provided by the EAS in the crash situation for plastically deforming the at least one plastically deformable energy absorber in order to decrease the acceleration and force acting on the object.

According to one aspect of the present invention, the EAS decreases acceleration and force for an occupant or object in a vehicle in a crash situation. More specifically, in aviation crash events an occurring vertical acceleration must be reduced to prevent injuries of seat occupants in the aircraft. Therefore, corresponding seat pans are adapted for striking towards the aircraft floor in order to increase time and way for decreasing acceleration on bodies of corresponding seat occupants. The inventive EAS thereby absorbs the kinetic energy generated by the occupant's mass and provides for preferably constant and limited body loads, e. g. lumbar loads. Due to varying occupant anthropometrics, the EAS has to be adjusted to the occupant's weight for the best result.

Advantageously, such an adjustment is done by means of an automatic adjustment, i.e. the self-adjustment of the EAS to a suitable compensation force and, thus, an acceptable crash force in a crash situation. This self-adjustment is performed on the basis of a measurement of the object's weight, e. g. a measurement of a weight of an occupant of a seat in the vehicle, and is therefore referred to as a mass-dependent self-adjusting. In other words, the inventive EAS weights the mass of the occupant or object prior to the crash situation and automatically adjusts a compensation force required in the crash situation in order to provide constant deceleration of a seat pan of the crashworthy seat in the crash situation.

Preferably, the adjustment is autonomously done, i.e. without need for an intervention of an operator in the vehicle or an occupant of the vehicle. Training of the operator or the occupant for adjusting the EAS is, thus, not required. Consequently, a complex manual adjustment of the EAS due to a possible wide minimum to maximum occupant weight range on such a crashworthy seat can be avoided. The EAS preferably also includes a mechanism to limit underlying tripping characteristics independent of the measured occupant or object weight.

Advantageously, the inventive EAS allows provision of crashworthy seats for vehicles, i.e. seats having a single seating surface, which allow, e.g. when used in aircrafts, reduction of body load on occupants of the seats occurring in an aircraft crash. It furthermore allows for an automatic and advantageous load distribution of unbalanced loads to two or more EAS. Moreover, the inventive EAS is a simple and robust, light weight, low-maintenance, non-electrical mechanism without need for complex electronics and power supplies. It uses available technical solutions and logistical equipment known from aerospace environment in general and is retrofitable into existing solutions.

According to a preferred embodiment, the mass-dependent self-adjusting mechanism comprises at least one first and one second roller that are spaced apart from each other by means of at least one spring pushing the first and second rollers in opposed directions. The first and second rollers are adapted for applying the required compensation force to the at least one plastically deformable energy absorber in the crash situation for plastically deforming the at least one plastically deformable energy absorber in the crash situation.

According to a further preferred embodiment, the at least one plastically deformable energy absorber is a plastically deformable tube.

According to one aspect, the inventive EAS is integrated into or next to a seat in a vehicle and consists of at least two rollers that are adapted for deforming a tube during a crash situation of the vehicle. Thus, the kinetic energy of e.g. an occupant of the seat can be converted to deformation and thermal energy by the deformation of the tube. An underlying compensation force for the deformation is dependent from a required degree of deformation, which advantageously depends from a self-adjustable distance between the at least two rollers. More specifically, a lower distance between the at least two rollers results in a higher degree of deformation that requires a higher deformation force.

According to a further preferred embodiment, the first and second rollers are pre-loadable in direction of the at least one plastically deformable energy absorber in normal operation mode by the underlying mass of the object.

According to a further preferred embodiment, the mass-dependent self-adjusting mechanism comprises a support frame. The first and second rollers are moveably mounted to the support frame and are moveable towards each other inside the support frame in normal operation mode on the basis of the underlying mass of the object, against a pushing force provided by the at least one spring, in order to allow self-adjustment of a mass-dependent deformation distance between the first and second rollers in the support frame.

According to a further preferred embodiment, the mass-dependent deformation distance determines the required compensation force that is applied by the first and second rollers to the at least one plastically deformable energy absorber in the crash situation for plastically deforming the at least one plastically deformable energy absorber in the crash situation. The required compensation force increases if the mass-dependent deformation distance decreases.

According to a further preferred embodiment, the mass-dependent self-adjusting mechanism comprises at least one damper. The at least one damper is adapted for maintaining the self-adjusted mass-dependent deformation distance between the first and second rollers in the crash situation at least approximately.

According to a further preferred embodiment, the mass-dependent self-adjusting mechanism comprises inclined surface members. The first and second rollers are arranged on the inclined surface members such that pre-loading of the first and second rollers in direction of the at least one plastically deformable energy absorber in normal operation mode by the underlying mass of the object is translatable into a rolling movement of the first and second rollers along the inclined surface members in direction of the at least one plastically deformable energy absorber. The rolling movement is construed for resulting in a movement of the first and second rollers towards each other inside the support frame.

According to a further preferred embodiment, the mass-dependent self-adjusting mechanism comprises an inclined surface member support. The inclined surface members are releasably mounted to the inclined surface member support.

More specifically, an underlying spacing between the at least two rollers is adjusted by the objects or occupant's mass, i.e. its measured weight, the inclined surface members and the at least one spring. The inclined surface members are preferably fixed relative to the plastically deformable tube in normal operation mode and do not move relative to each other. The at least two rollers are preferentially guided horizontally in the inclined surface member support, such as a frame that is e.g. fixed to a seat pan. The damper-spring system defined by the at least one spring and the at least one damper is preferably only connected to the at least two rollers.

According to a further preferred embodiment, the mass-dependent self-adjusting mechanism comprises at least one trigger mechanism that is adapted for triggering release of the inclined surface members from the inclined surface member support in the crash situation.

According to one aspect of the present invention, the trigger mechanism blocks a horizontal or sideward movement of the inclined surface members in normal operation mode. The trigger mechanism preferably releases the inclined surface members, i.e. allows a horizontal or sideward movement thereof, only in a crash situation. Such a release is preferably independent from the object's weight and is only triggered if a predetermined acceleration is exceeded.

More specifically, preferably a trigger wheel fixes the inclined surface members from moving horizontally, i.e. sideward. An associated trigger mass is pushed upwards against a blocking member by a spring member. The trigger mass and the trigger wheel are connected by a lever. The lever is fixed on a pivot bearing. If the predetermined acceleration exceeds an adjusted value, the forces of the mass inertia exceed the spring forces and the lever starts rotating. The trigger wheel, thus, moves upward and releases the inclined surface members, which may consequently move horizontally, i.e. sideward.

According to a further preferred embodiment, the trigger mechanism comprises at least one trigger wheel for each one of the inclined surface members. The at least one trigger wheel is connected to a trigger mass and is maintained immobile against an associated inclined surface member in the normal operation mode by means of the trigger mass for maintaining the associated inclined surface member in a predetermined blocking position of the at least one trigger wheel on the inclined surface member support in the normal operation mode.

According to a further preferred embodiment, the trigger mechanism comprises at least one lever. The lever connects the at least one trigger wheel to the trigger mass. The lever is pivotally mounted to an associated pivot bearing and rotatable around the associated pivot bearing in response to an acceleration of the trigger mass in a predetermined acceleration direction occurring in a crash situation.

According to a further preferred embodiment, the lever is connected to a spring member. The spring member preloads the at least one trigger wheel by means of the lever into the predetermined blocking position.

According to a further preferred embodiment, the object in the vehicle is a vehicle seat or an occupant of the vehicle seat. The support frame is integrated into a seat pan of the vehicle seat.

Preferably, the entire EAS is part of the vehicle seat.

The present invention further provides a vehicle seat for a vehicle, in particular for a rotorcraft. The vehicle seat is provided with an energy absorbing system as described above.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
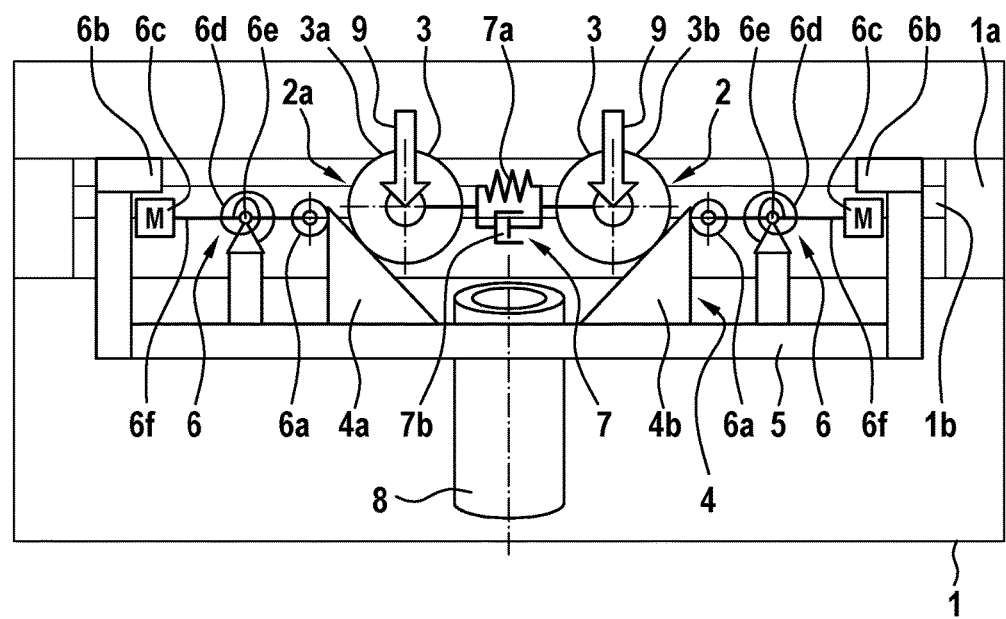
FIG. 1 shows a schematic side view of a vehicle seat in an adjustment phase according to the present invention, when used by a comparatively light-weight occupant.

FIG. 1 shows a vehicle seat 1 for a vehicle. According to one aspect of the present invention, the vehicle seat 1 is a crashworthy seat that is provided with an EAS 2, and the vehicle is an aircraft, in particular a rotorcraft and, more particularly, a helicopter. However, it should be noted that the vehicle is not illustrated in detail, as the vehicle as such is not part of the present invention, so that illustration thereof can be omitted for simplicity of the drawings.

The crashworthy seat 1 illustratively comprises at least a seat pan 1a that houses a support frame 1b. Preferably, the support frame 1b is integrated into the seat pan 1a. The seat pan 1a and the support frame 1b are preferably adapted for accommodating at least partly the EAS 2.

According to one aspect of the present invention, the EAS 2 is adapted for absorbing energy of the crashworthy seat 1 and/or an occupant of the crashworthy seat 1 in a crash situation of the vehicle by decreasing acceleration and force acting on the crashworthy seat 1 and/or the occupant of the crashworthy seat 1 in the crash situation. However, it should be noted that the crashworthy seat 1 and/or the occupant of the crashworthy seat 1 are merely cited and described as examples for any arbitrary object in the vehicle that may be equipped with the EAS 2 according to the present invention, such as e.g. cargo retainers and so on. Therefore, the terminology "object 1" is used hereinafter instead of the terminology "crashworthy seat 1".

Preferably, the EAS 2 comprises a mass-dependent self-adjusting mechanism 2a and at least one plastically deformable energy absorber 8 that is plastically deformable in a crash situation of the vehicle. The at least one plastically deformable energy absorber 8 is preferentially a plastically deformable tube.

According to one aspect of the present invention, the mass-dependent self-adjusting mechanism 2a is at least adapted for adjusting, on the basis of an underlying mass of the object 1, a required compensation force that is to be provided by the EAS 2 in a crash situation of the vehicle for plastically deforming the at least one plastically deformable tube 8 in order to decrease acceleration and force acting on the object 1 in the crash situation. For this, the self-adjusting mechanism 2a is provided with at least one and, preferably, at least two rollers 3 that are adapted for applying the required compensation force to the at least one plastically deformable tube 8 in the crash situation of the vehicle for plastically deforming the at least one plastically deformable tube 8 in the crash situation.

Illustratively, the at least two rollers 3 comprise a first roller 3a and a second roller 3b. Therefore, by way of example and not for limiting the invention thereto, reference is only made to the first and second rollers 3a, 3b hereinafter.

The first and second rollers 3a, 3b are exemplarily arranged on two opposed peripheral sides of the at least one plastically deformable tube 8 with a displacement of illustratively 180°, by way of example on left and right sides thereof. However, other amounts of rollers and other arrangements thereof with respect to the at least one plastically deformable tube 8 are likewise possible. For instance, three rollers with a relative displacement of approximately 120° with respect to each other can likewise be applied, and so on.

Preferably, the first and second rollers 3a, 3b are moveably mounted to the support frame 1b. More specifically, the first and second rollers 3a, 3b are preferably moveable towards each other inside the support frame 1b in normal operation mode of the EAS 2 on the basis of the underlying mass of the object 1, as described in more detail below. The support frame 1b is, therefore, considered as being part of the mass-dependent self-adjusting mechanism 2a.

According to one aspect of the present invention, the mass-dependent self-adjusting mechanism 2a further comprises inclined surface members 4. The latter illustratively exhibit triangular cross sections and are arranged such that inclined surfaces thereof are facing each other and oriented towards the at least one plastically deformable tube 8 for respectively defining down-grades towards the at least one plastically deformable tube 8.

By way of example, the inclined surface members 4 comprise at least a first inclined surface member 4a and a second inclined surface member 4b. Therefore, by way of example and not for limiting the invention thereto, reference is only made to the first and second inclined surface members 4a, 4b hereinafter. However, it should be noted that an underlying number of applied inclined surface members may vary dependent on an applied number of rollers and a desired configuration of the mass-dependent self-adjusting mechanism 2a.

The first and second rollers 3a, 3b are preferably arranged on the first and second inclined surface members 4a, 4b, i.e. on the inclined surfaces that are facing each other. More specifically, the first roller 3a is arranged on the first inclined surface member 4a and the second roller 3b is arranged on the second inclined surface member 4b, such that preloading of the first and second rollers 3a, 3b in direction of the at least one plastically deformable tube 8 in normal operation mode of the EAS 2 by the underlying mass of the object 1 is translatable into a rolling movement of the first and second rollers 3a, 3b along the first and second inclined surface members 4a, 4b in direction of the at least one plastically deformable tube 8. The rolling movement is preferentially construed for resulting in a movement of the first and second rollers 3a, 3b towards each other inside the support frame 1b.

Preferably, the first and second inclined surface members 4a, 4b are releasably mounted to an inclined surface member support 5. The latter is preferentially also part of the mass-dependent self-adjusting mechanism 2a.

According to one aspect of the present invention, the mass-dependent self-adjusting mechanism 2a further comprises at least one trigger mechanism 6 that is adapted for triggering release of the first and second inclined surface members 4a, 4b, from the inclined surface member support 5 in a crash situation of the vehicle. Preferably, each one of the first and second inclined surface members 4a, 4b has an associated trigger mechanism 6.

The trigger mechanism 6 preferably comprises at least one trigger wheel 6a that is connected to a trigger mass 6c. The trigger wheel 6a is maintained immobile against the associated one of the first and second inclined surface members 4a, 4b in the normal operation mode of the EAS 2 by means of the trigger mass 6c for maintaining its associated inclined surface member 4a, 4b in a predetermined blocking position of the at least one trigger wheel 6a on the inclined surface member support 5 in the normal operation mode, as illustrated in FIG. 1.

More specifically, the trigger mechanism 6 preferably comprises at least one lever 6f, which connects the trigger wheel 6a to the trigger mass 6c. The lever 6f is pivotally mounted to an associated pivot bearing 6e and rotatable around the associated pivot bearing 6e in response to an acceleration of the trigger mass 6c in a predetermined acceleration direction (12 in FIG. 8) occurring in a crash situation of the vehicle.

Preferably, the lever 6f is connected to a spring member 6d that preloads the trigger wheel 6a by means of the lever 6f into the predetermined blocking position. More specifically, the spring member 6d, which is preferentially embodied as a rotary spring, preferably preloads the lever 6f such that the trigger mass 6c is pushed upwards—in FIG. 1—against an associated blocking member 6b. Illustratively, the latter is implemented as a part of the inclined surface member support 5. Consequently, as the lever 6f pivots, respectively rotates, around the associated pivot bearing 6e, the trigger wheel 6a is pushed downwards—in FIG. 1—, such that the trigger wheel 6a abuts against its associated inclined surface member 4a, respectively 4b. The latter is, thus, blocked and maintained in the predetermined blocking position, wherein an outwardly directed horizontal, i.e. sideward, movement of its associated inclined surface member 4a, respectively 4b, is prevented.

According to one aspect of the present invention, the mass-dependent self-adjusting mechanism 2a further comprises at least one spring 7a that pushes the first and second rollers 3a, 3b in opposed directions. Thus, the first and one second rollers 3a, 3b are spaced apart from each other by means of a pushing force that is provided by the at least one spring 7a, and an adjustable deformation distance (10a in FIGS. 3 and 10b in FIG. 6) between the first and second rollers 3a, 3b in the support frame 1b is created.

The mass-dependent self-adjusting mechanism 2a preferably further comprises at least one damper 7b. The at least one damper 7b is preferentially adapted for maintaining the adjustable deformation distance (10a in FIGS. 3 and 10b in FIG. 6) between the first and second rollers 3a, 3b at a respectively adjusted value in a crash situation of the vehicle at least approximately. Preferably, the at least one damper 7b is a viscous damper that hydro-mechanically "memorizes" a respectively adjusted deformation distance (10a in FIGS. 3 and 10b in FIG. 6). The at least one damper 7b and the at least one spring 7a preferably define a spring-damper unit 7.

It should be noted that the adjustable deformation distance (10a in FIGS. 3 and 10b in FIG. 6) determines the required compensation force that is applied by the first and second rollers 3a, 3b to the at least one plastically deformable tube 8 in a crash situation of the vehicle for plastically deforming the at least one plastically deformable tube 8 in the crash situation. Preferably, the required compensation force increases if the adjustable deformation distance (10a in FIGS. 3 and 10b in FIG. 6) decreases and it decreases if the adjustable deformation distance (10a in FIGS. 3 and 10b in FIG. 6) increases.

In normal operation mode of the EAS 2, the first and second rollers 3a, 3b are pre-loadable in direction of the at least one plastically deformable tube 8 by the underlying mass of the object 1. More specifically, the first and second rollers 3a, 3b are moveable towards each other inside the support frame 1b in the normal operation mode on the basis of the underlying mass of the object 1 against a pushing force provided by the at least one spring 7a of the spring-damper unit 7, in order to allow self-adjustment of the adjustable deformation distance (10a in FIGS. 3 and 10b in FIG. 6). Therefore, the adjustable deformation distance (10a in FIGS. 3 and 10b in FIG. 6) is also referred to as the "mass-dependent deformation distance" hereinafter. This self-adjustment of the mass-dependent deformation distance (10a in FIGS. 3 and 10b in FIG. 6) is preferably always executed in an initial adjustment phase that is performed each time the mass-dependent self-adjusting mechanism 2a is used in normal operation mode of the EAS 2, as described below.

In the initial adjustment phase in the normal operation mode of the EAS 2, the first and second rollers 3a, 3b are pushed in the direction of the at least one plastically deformable tube 8 by the underlying mass of the object 1, which applies a load 9 to the first and second rollers 3a, 3b. The first and second rollers 3a, 3b are, thus, forced to perform a rolling movement along the first and second inclined surface members 4a, 4b in the direction of the at least one plastically deformable tube 8, i.e. in FIG. 1 downwards the first and second inclined surface members 4a, 4b. This rolling movement is performed against the pushing force of the at least one spring 7a of the spring-damper unit 7 and, thus, translated by the inclined surface members 4a, 4b into generation of a compression force for compression of the at least one spring 7a, whereby the mass-dependent deformation distance (10a in FIGS. 3 and 10b in FIG. 6) is adjusted dependent on the weight of the underlying mass of the object 1. The rolling movement stops at a point, where an equilibrium between the pushing force of the at least one spring 7a and the generated compression force is reached, so that the mass-dependent deformation distance (10a in FIGS. 3 and 10b in FIG. 6) is adjusted for the underlying mass of the object 1. This adjusted mass-dependent deformation distance (10a in FIGS. 3 and 10b in FIG. 6) is then preferably maintained at least essentially invariable by means of the at least one damper 7b of the spring-damper unit 7 as long as the load 9 is applied to the first and second rollers 3a, 3b.

Figure 3:
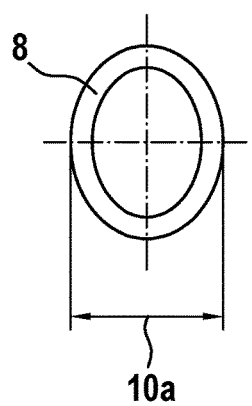
FIG. 3 shows a top view of a plastically deformable tube of FIG. 1 and FIG. 2 after deformation.
Figure 6:
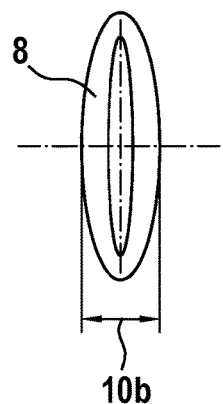
FIG. 6 shows a top view of a plastically deformable tube of FIG. 4 and FIG. 5 after deformation.

It should, however, be noted that the form of the first and second inclined surface members 4a, 4b and underlying spring characteristics of the at least one spring 7a affect the adjusted mass-dependent deformation distance (10a in FIGS. 3 and 10b in FIG. 6). Generally, a comparatively small mass-dependent deformation distance (10a in FIGS. 3 and 10b in FIG. 6) results in a comparatively high degree of plastic deformation of the plastically deformable tube 8 in a crash situation and a comparatively high compensation force for deformation, while a comparatively great mass-dependent deformation distance (10a in FIGS. 3 and 10b in FIG. 6) results in a comparatively low degree of plastic deformation of the plastically deformable tube 8 in a crash situation and a comparatively low compensation force for deformation.

Figure 2:
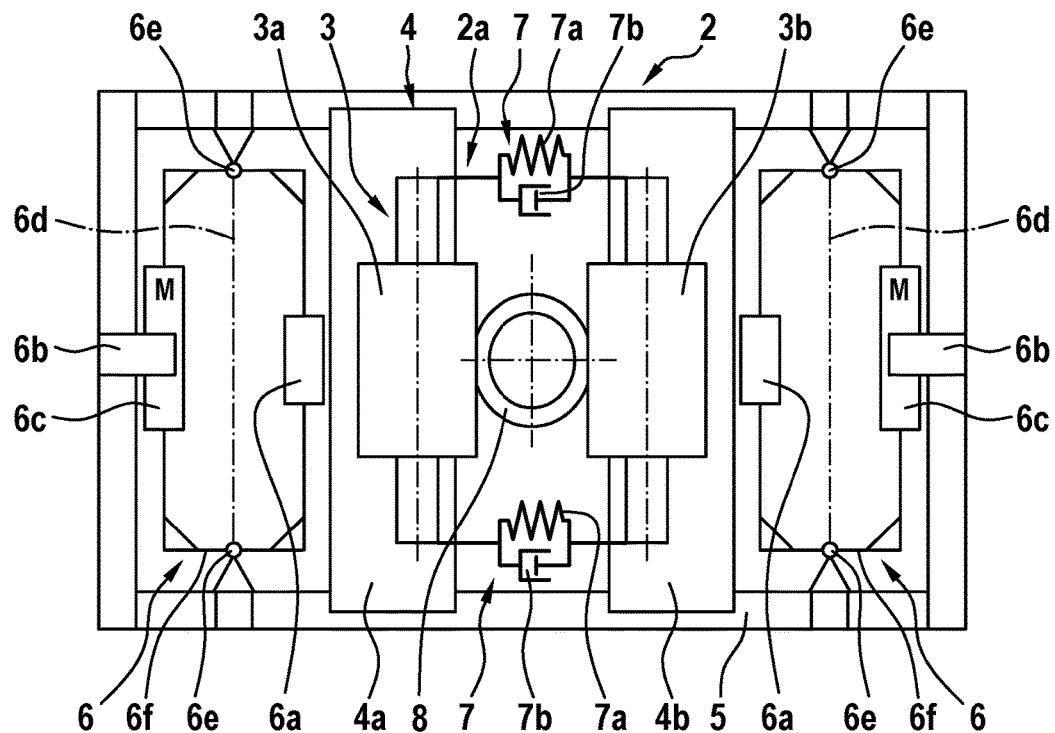
FIG. 2 shows a schematic top view of the vehicle seat of FIG. 1.

FIG. 2 shows the EAS 2 of FIG. 1 with the mass-dependent self-adjusting mechanism 2a after the initial adjustment phase in the normal operation mode of the EAS 2 as described above with reference to FIG. 1. Preferably, the mass-dependent self-adjusting mechanism 2a is provided with two separate spring-damper units 7, each comprising at least one spring 7a and at least one damper 7b, which are preferentially arranged laterally with respect to the first and second rollers 3a, 3b, preferably in the support frame 1b of FIG. 1.

According to one aspect of the present invention, the lever 6f of the trigger mechanism 6 is embodied as a frame that interconnects the trigger wheel 6a and the trigger mass 6c. However, it should be noted that this implementation is merely shown by way of example and not for limiting the invention accordingly. Instead, the lever 6f may also be embodied as a lever arm, so that e.g. two trigger mechanisms 6 with arm-like levers 6f can be employed per inclined surface member, i.e. the first or second inclined surface member 4a or 4b, and so on.

FIG. 3 shows the plastically deformable tube 8 of FIG. 1 and FIG. 2 after a plastic deformation thereof by means of the first and second rollers 3a, 3b in a crash situation. As can be seen from FIG. 3, the tube 8 now no more exhibits a circular cross section like in FIG. 1 and FIG. 2, but instead an oval cross section, as it was compressed by the first and second rollers to a mass-dependent deformation distance 10a that was initially adjusted as described above.

Figure 4:
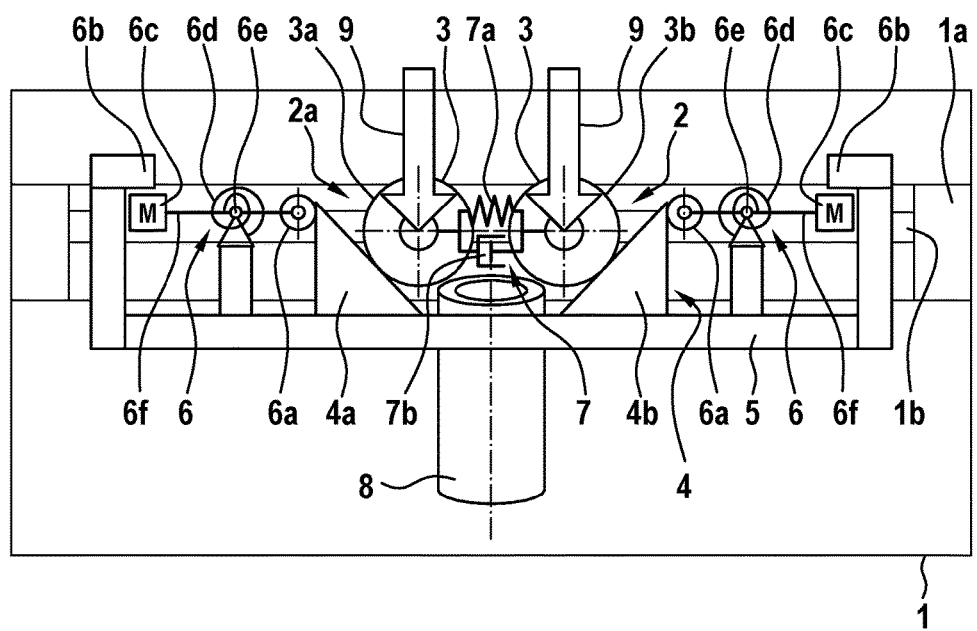
FIG. 4 shows a schematic side view of the vehicle seat of FIG. 1 in an adjustment phase according to the present invention, when used by a comparatively heavy-weight occupant.

FIG. 4 shows the object 1 of FIG. 1 with the EAS 2 of FIG. 1 that comprises the mass-dependent self-adjusting mechanism 2a of FIG. 1 in an initial adjustment phase in the normal operation mode of the EAS 2 in a case, wherein the applied load 9 is greater than in FIG. 1. This happens if the underlying mass of the object 1 is greater than in FIG. 1. In this case, the first and second rollers 3a, 3b are pushed further towards the plastically deformable tube 8 than in FIG. 1, as the applied load 9 is suitable for generating a greater compression force for compression of the at least one spring 7a of the spring-damper unit 7.

Figure 5:
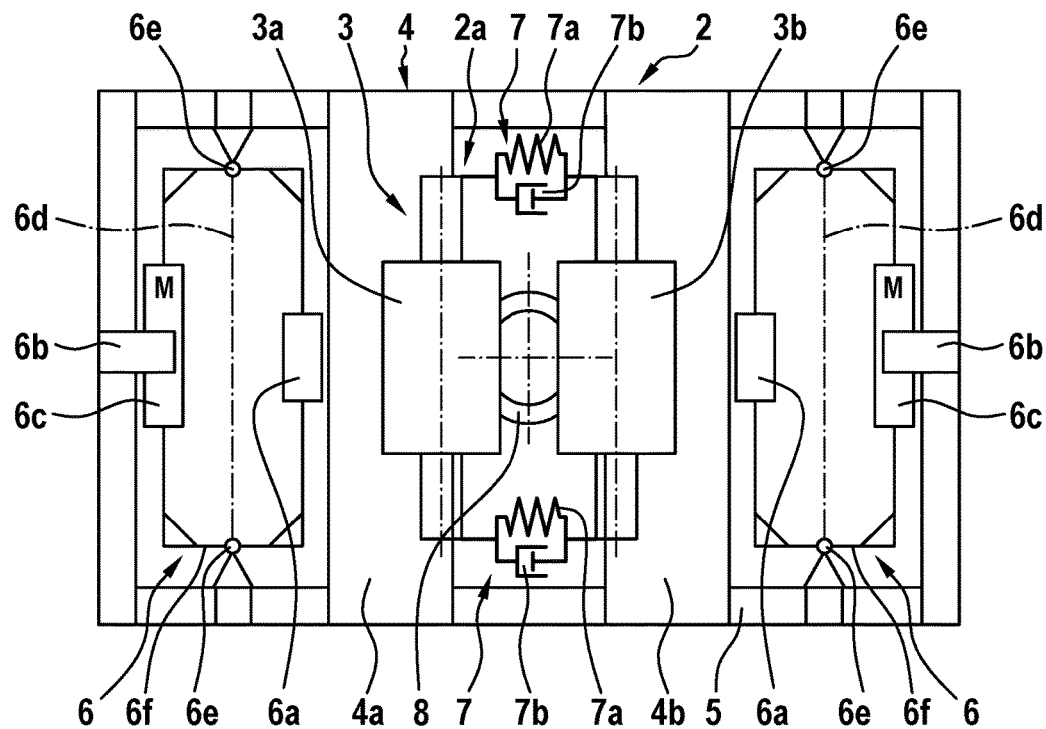
FIG. 5 shows a schematic top view of the vehicle seat of FIG. 4.

FIG. 5 shows the EAS 2 of FIG. 4 with the mass-dependent self-adjusting mechanism 2a after the initial adjustment phase in the normal operation mode of the EAS 2. The initial adjustment phase is performed similar to what is described above with reference to FIG. 1, so that a more detailed description thereof can be omitted for brevity and conciseness.

FIG. 6 shows the plastically deformable tube 8 of FIG. 4 and FIG. 5 after a plastic deformation thereof by means of the first and second rollers 3a, 3b in a crash situation. As can be seen from FIG. 6, the tube 8 now no more exhibits a circular cross section like in FIG. 1 and FIG. 2, but instead an oval cross section, as it was compressed by the first and second rollers to a mass-dependent deformation distance 10b that was initially adjusted as described above.

It should be noted that the mass-dependent deformation distance 10b is smaller than the mass-dependent deformation distance 10a of FIG. 3. This is necessary as the required compensation force that must be applied by the first and second rollers 3a, 3b to the plastically deformable tube 8 for plastically deforming the latter in a crash situation must be greater for comparatively great underlying masses of the object 1, than for comparatively small underlying masses of the object 1, in order to achieve a suitable energy absorption/attenuation.

Figure 7:
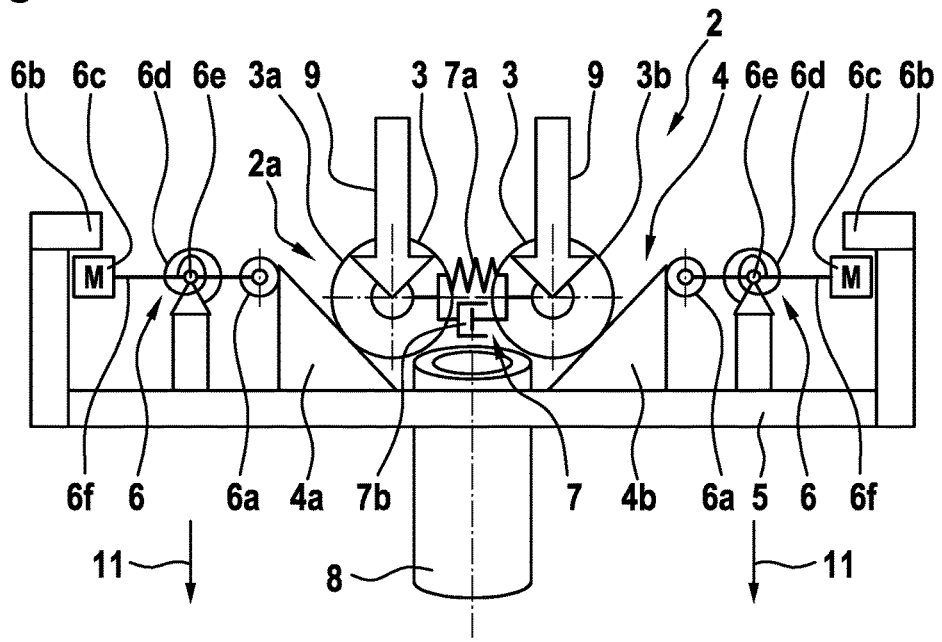
FIG. 7 to FIG. 9 show schematic side views of the vehicle seat of FIG. 4 in a crash situation.
Figure 8:
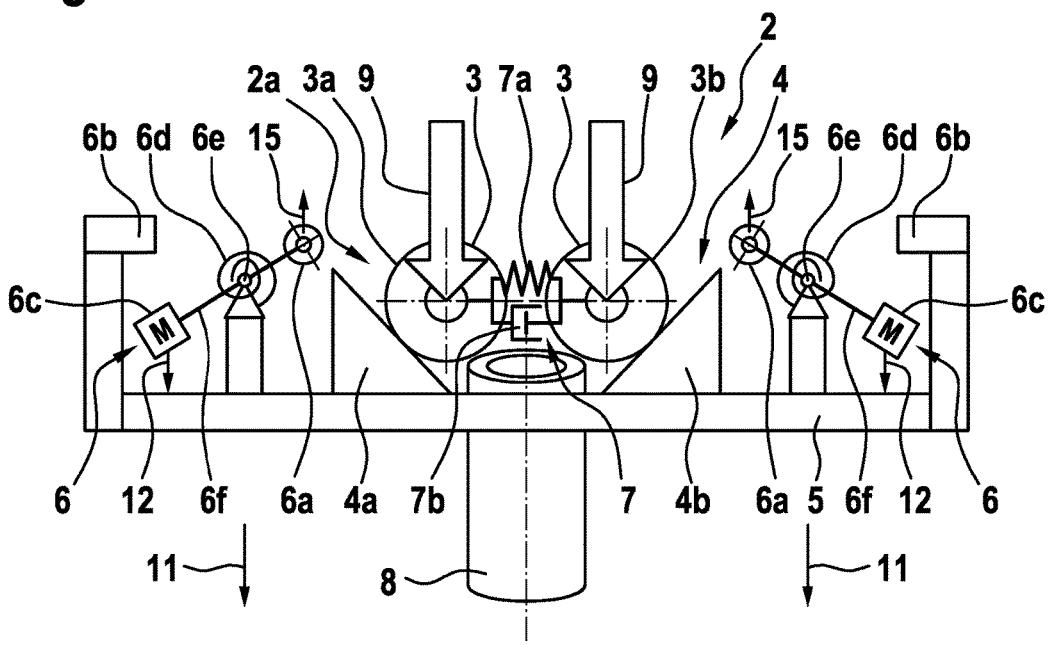
Figure 9:
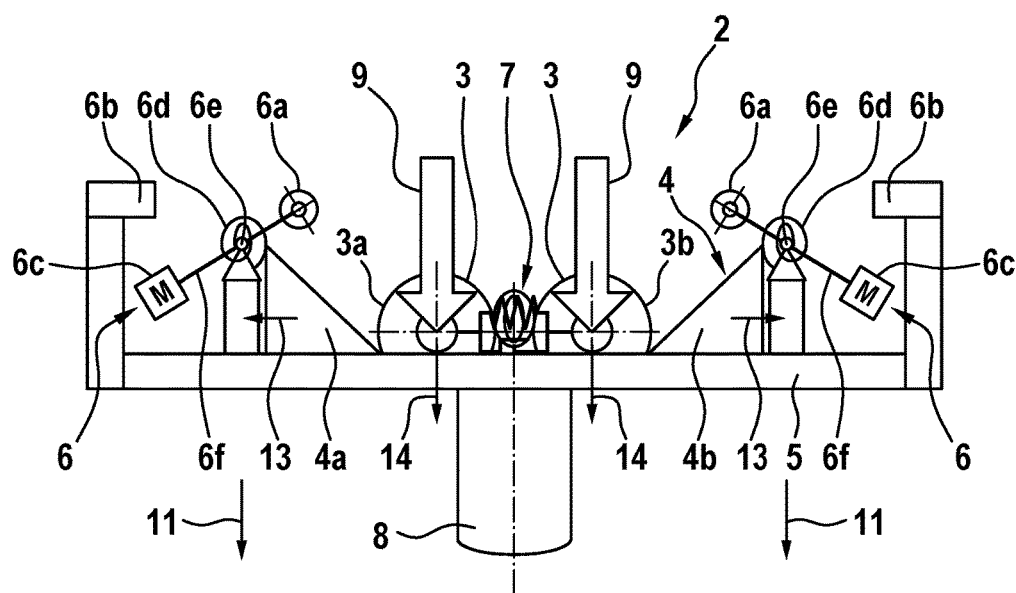

FIG. 7 to FIG. 9 show the EAS 2 of FIG. 4 that comprises the mass-dependent self-adjusting mechanism 2a of FIG. 4 in an exemplary crash situation. In other words, the crash situation is described by way of example on the basis of the EAS 2 as described above with reference to FIG. 4, wherein the applied load 9 of the object 1 of FIG. 4 is comparatively great and the mass-dependent deformation distance consequently comparatively small, i.e. exemplarily corresponds to the mass-dependent deformation distance 10b of FIG. 6.

FIG. 7 shows the EAS 2 after the initial adjustment phase in normal operation mode of the EAS 2 according to FIG. 4 upon occurrence of a crash situation. Illustratively, occurrence of the crash situation consists of results in an acceleration of the object 1 of FIG. 4, i.e. the seat pan 1a of FIG. 4, in a crash situation movement direction 11. At the beginning of this acceleration, the trigger mechanism 6 blocks, i.e. maintains, the inclined surface member 4a, respectively 4b, in the predetermined blocking position, wherein an outwardly directed horizontal, i.e. sideward, movement of the inclined surface member 4a, respectively 4b, is prevented.

FIG. 8 shows the EAS 2 of FIG. 7 upon activation of the trigger mechanism 6 by means of the acceleration in the crash situation movement direction 11 according to FIG. 7. If this acceleration exceeds a predetermined value, the forces of the mass inertia of the trigger mass 6c of the trigger mechanism 6 exceed the spring forces of the spring member 6d of the trigger mechanism 6 and its lever 6f starts rotating, i.e. pivoting, such that the trigger mass 6c moves into a trigger mass acceleration direction 12—i.e. downwards in FIG. 8—and that the trigger wheel 6a of the trigger mechanism 6 moves into a trigger wheel release movement direction 15—i.e. upwards in FIG. 8—and, thereby, releases the inclined surface member 4a, respectively 4b, from its blocking position. The first and second inclined surface members 4a, 4b may, thus, move horizontally, i.e. sideward, on the inclined surface member support 5.

FIG. 9 shows the EAS 2 of FIG. 8 after an exemplary horizontal, i.e. sideward movement of the inclined surface members 4a, 4b on the inclined surface member support 5 in an inclined surface member sideward movement direction 13. It should be noted that this sideward movement is forced by the first and second rollers 3a, 3b, which are accelerated in the crash situation in an associated deformation movement direction 14 towards the plastically deformable tube 8 and, thus, push the inclined surface members 4a, 4b outwardly while rolling on them.

It should be noted that during this rolling, the mass-dependent deformation distance 10b of FIG. 6 is maintained by means of the damper 7b of the spring-damper unit 7. In fact, the at least one damper 7b is preferably adapted for not responding in the very short and quickly running crash situation.

Consequently, the first and second rollers 3a, 3b perform a rolling movement along at least a part of the plastically deformable tube 8, while the mass-dependent deformation distance 10b of FIG. 6 is maintained. This leads to a plastic deformation of the plastically deformable tube 8 as illustrated in FIG. 6.

It should be noted that modifications to the above described embodiments are within the common knowledge of the person skilled in the art and, thus, also considered as being part of the present invention. For instance, the inventive EAS cannot only be applied to crashworthy seats, but also e. g. in storage compartments of vehicles that are provided with cargo retainers, and so on. Furthermore, the plastically deformable tube 8 described above can be filled with a material that absorbs most of the energy in a crash situation. This will lead to a more linear stopping force over deformation degree characteristics. It also decreases the risk of buckling of the tube.

REFERENCE LIST 1 rotorcraft seat
1a seat pan
1b support frame
2 EAS
2a mass-dependent self-adjusting mechanism
3 frame mounted rollers
3a first roller
3b second roller
4 inclined surface members
4a first inclined surface member
4b second inclined surface member
5 inclined surface member support
6 trigger mechanism
6a trigger wheel
6b blocking member
6c trigger mass
6d spring member
6e pivot bearing
6f lever
7 spring-damper units
7a spring
7b damper
8 plastically deformable energy absorber
9 applied load
10a low weight deformation measure
10b high weight deformation measure
11 seat pan crash situation movement direction
12 trigger mass acceleration direction
13 inclined surface member sideward movement direction
14 frame mounted roller deformation movement direction
15 trigger wheel release movement direction

What is claimed is:

1. An energy absorbing system that is adapted for absorbing energy of an object in a vehicle in a crash situation by decreasing acceleration and force acting on the object in the crash situation, the energy absorbing system comprising at least one plastically deformable energy absorber that is plastically deformable in the crash situation, the energy absorbing system being provided with a mass-dependent self-adjusting mechanism, the mass-dependent self-adjusting mechanism being adapted for adjusting, on the basis of an underlying mass of the object, a required compensation force that is to be provided by the energy absorbing system in the crash situation for plastically deforming the at least one plastically deformable energy absorber in order to decrease the acceleration and force acting on the object, wherein the mass-dependent self-adjusting mechanism comprises at least one first and one second roller that are spaced apart from each other by means of at least one spring pushing the first and second rollers in opposed directions, the first and second rollers being adapted for applying the required compensation force to the at least one plastically deformable energy absorber in the crash situation for plastically deforming the at least one plastically deformable energy absorber in the crash situation.

2. The energy absorbing system according to claim 1, wherein the at least one plastically deformable energy absorber is a plastically deformable tube.

3. The energy absorbing system according to claim 1, wherein the first and second rollers are pre-loadable in direction of the at least one plastically deformable energy absorber in normal operation mode by the underlying mass of the object.

4. The energy absorbing system according to claim 3, wherein the mass-dependent self-adjusting mechanism comprises a support frame, the first and second rollers being moveably mounted to the support frame and being moveable towards each other inside the support frame in normal operation mode on the basis of the underlying mass of the object, against a pushing force provided by the at least one spring, in order to allow self-adjustment of a mass-dependent deformation distance between the first and second rollers in the support frame.

5. The energy absorbing system according to claim 4, wherein the mass-dependent deformation distance determines the required compensation force that is applied by the first and second rollers to the at least one plastically deformable energy absorber in the crash situation for plastically deforming the at least one plastically deformable energy absorber in the crash situation, wherein the required compensation force increases if the mass-dependent deformation distance decreases.

6. The energy absorbing system according to claim 4, wherein the mass-dependent self-adjusting mechanism comprises at least one damper, the at least one damper being adapted for maintaining the self-adjusted mass-dependent deformation distance between the first and second rollers in the crash situation at least approximately.

7. The energy absorbing system according to claim 6, wherein the mass-dependent self-adjusting mechanism comprises inclined surface members, the first and second rollers being arranged on the inclined surface members such that pre-loading of the first and second rollers in direction of the at least one plastically deformable energy absorber in normal operation mode by the underlying mass of the object is translatable into a rolling movement of the first and second rollers along the inclined surface members in direction of the at least one plastically deformable energy absorber, the rolling movement being construed for resulting in a movement of the first and second rollers towards each other inside the support frame.

8. The energy absorbing system according to claim 7, wherein the mass-dependent self-adjusting mechanism comprises an inclined surface member support, the inclined surface members being releasably mounted to the inclined surface member support.

9. The energy absorbing system according to claim 8, wherein the mass-dependent self-adjusting mechanism comprises at least one trigger mechanism that is adapted for triggering release of the inclined surface members from the inclined surface member support in the crash situation.

10. The energy absorbing system according to claim 9, wherein the trigger mechanism comprises at least one trigger wheel for each one of the inclined surface members, the at least one trigger wheel being connected to a trigger mass and being maintained immobile against an associated inclined surface member in the normal operation mode by means of the trigger mass for maintaining the associated inclined surface member in a predetermined blocking position of the at least one trigger wheel on the inclined surface member support in the normal operation mode.

11. The energy absorbing system according to claim 10, wherein the trigger mechanism comprises at least one lever, the lever connecting the at least one trigger wheel to the trigger mass, wherein the lever is pivotally mounted to an associated pivot bearing and rotatable around the associated pivot bearing in response to an acceleration of the trigger mass in a predetermined acceleration direction occurring in a crash situation.

12. The energy absorbing system according to claim 11, wherein the lever is connected to a spring member, the spring member preloading the at least one trigger wheel my means of the lever into the predetermined blocking position.

13. The energy absorbing system according to claim 12, wherein the object in the vehicle is a vehicle seat or an occupant of the vehicle seat, wherein the support frame is integrated into a seat pan of the vehicle seat.

14. A vehicle seat for a vehicle, the vehicle seat being provided with an energy absorbing system according to claim 1.

15. A vehicle having a vehicle seat, the vehicle seat being provided with an energy absorbing system according to claim 1, wherein the vehicle is a rotorcraft.

* * * * *